United States Patent [19]

Jones

[11] Patent Number: 4,532,399
[45] Date of Patent: Jul. 30, 1985

[54] APPARATUS AND METHOD OF WELDING NAILS TO WIRES

[75] Inventor: Paul W. Jones, Jamestown, R.I.

[73] Assignee: Textron Inc., Providence, R.I.

[21] Appl. No.: 661,270

[22] Filed: Oct. 16, 1984

Related U.S. Application Data

[63] Continuation of Ser. No. 370,527, Apr. 21, 1982, abandoned.

[51] Int. Cl.³ .............................................. B23K 11/10
[52] U.S. Cl. .................... 219/117.1; 219/56; 219/114; 219/115
[58] Field of Search .................. 219/56, 58, 114, 115, 219/110, 117.1

[56] References Cited

U.S. PATENT DOCUMENTS

| | | | |
|---|---|---|---|
| 2,264,175 | 11/1941 | Dawson | 219/4 |
| 2,673,275 | 3/1954 | Kreft | 219/6 |
| 3,083,369 | 4/1963 | Peterson | 1/56 |
| 3,708,646 | 1/1973 | Ritter | 219/56 |
| 3,798,405 | 3/1974 | Boothe | 219/56 |
| 4,144,440 | 3/1979 | Schalch | 219/61.5 |
| 4,409,461 | 10/1983 | Mizutani | 219/56 |

FOREIGN PATENT DOCUMENTS 56-141979  11/1981  Japan ................... 219/110

Primary Examiner—Clifford C. Shaw
Attorney, Agent, or Firm—Cushman, Darby & Cushman

[57] ABSTRACT

An improvement in a method of welding the shanks of successive nails to a pair of wires to form a series of wire connected nails suitable for packaging and use in a power driven fastener driving device which includes the steps of connecting a pair of electrodes with a source of electrical current characterized by repetitive cycles and effecting repetitive nail-to-wire cycles each of which includes an initial movement of (1) the shank of an unattached nail (2) a pair of wires extending transversely thereacross and (3) the electrodes from a position of initial contact into a welding station wherein pressurized contact between the electrodes, the nail shank and the wires is maintained and a final movement out of the welding station to a final release position of the electrodes with respect to the welded together nail shank and wires. The improvement comprises the step of synchronizing the electrical current cycles connected with the electrodes and the nail-to-wire cycles so that a similar portion of each current cycle will flow through each unattached nail and the pair of wires between the electrodes during the time period of each nail-to-wire cycle when the latter are in the welding station. Apparatus is disclosed for carrying out the method.

16 Claims, 5 Drawing Figures

APPARATUS AND METHOD OF WELDING NAILS TO WIRES

This is a continuation of application Ser. No. 370,527, filed Apr. 21, 1982 now abandoned.

This invention relates to the formation of nail packages for use in power actuated fastener driving devices and more particularly to the formation of welded wire nail packages of the type disclosed in commonly assigned U.S. Pat. No. 3,083,369.

The machines which have heretofore been used to form the coiled nail packages of the patent have consisted essentially of a rotor or wheel having nail receiving pockets spaced about the periphery thereof with a spacing equal to that required in the final package. A supply of loose nails is fed from a conventional bowl feeder into a downwardly extending guide where the nails are supported by opposed parallel rails along opposite sides of their heads with the shanks suspended vertically between the rails. The guide serves to direct successive lowermost nails into successive pockets of the rotor as the latter moves about its axis. The rotor serves to move successive nails supported in properly oriented relation within successive pockets into exterior peripheral shank engagement with a pair of wires oriented in perpendicular relation to the direction of extent of the nail shanks. The pair of wires is fed and guided into peripheral engagement with the nail shanks supported by the rotor by a pair of rotary disc electrodes each of which is suitably peripherally grooved to receive the associated wire so that the shank engaging surface thereof is presented for engagement with the nail shanks.

In the machines currently employed, the nail carrying rotor is driven continuously by an electric motor through an infinitely variable speed reducing assembly of the type embodying two adjustable v. belt pulleys. The disc electrodes are mounted for rotation about a common rotational axis parallel with the axis of rotation of the nail rotor and for spring biased movement in a direction toward the rotor axis. The disc electrodes thus present the wires to the nail shanks with an action similar to that provided by a cam and cam follower. The continuous operation of the nail rotor results in the performance of repetitive cycles which may be regarded as beginning when the wires carried by the disc electrodes initially engage the shank of the next nail while the disc electrodes, wires and shank of the nail which has just been welded are still in contact. As the cycle proceeds, the newly welded nail with the wires weldingly attached thereto moves out of contact and away from the disc electrodes while the next unattached nail moves into greater pressure contact with the wires carried by the disc electrodes. This pressure engagement is increased to a maximum and is maintained through a portion of the cycle which presents the most desirable conditions for the resistance welding operation to take place. In actual operation this optimum welding portion of each cycle is approximately one quarter of the entire cycle. Each cycle may therefore be conveniently regarded as consisting of an intermediate portion where the electrodes, nail shank and wires are maintained in optimum pressure engagement, an initial portion where an unattached nail and the wires are moved from an initially contacted condition to the aforesaid optimum pressurized condition and a final portion where the pressure of the electrodes is released and the electrodes are moved away from the welded together nail shank and wires.

In addition to the continuously moving apparatus of the prior art which is operable to weld headed nails in parallel spaced relation to the pair of wires, there have also been utilized in the prior art, apparatus for welding notched head nails in shank-to-shank headed overlapping relation with a pair of wires. These notched-head nails are packaged in rigid stick formation for use in power driven fastener driving devices whereas the spaced parallel full headed nails are packaged in coil formation for use in power operated fastener driving devices. Because these stick formation machines require the individual orientation of each succeeding nail into the notch in the head of the nail which preceded it, they have heretofore utilized an intermittent movement rather than a continuous movement. In terms of each individual nail-to-wire cycle, the dwell period of the intermittent movement was made to correspond with the intermediate portion of the cycle where the pressure conditions between the electrodes, the unattached nail shank and the wires is optimized for the welding operation to take place. Moreover, each actual nail-to-wire cycle of the intermittently moved machines was carried out with the use of similar spring pressed disk electrodes so that each nail-to-wire cycle consisted of the same intermediate portion where the electrodes, nail shank and wires are maintained in pressurized condition for resistance welding, an initial portion which includes movement from an initial contact condition to the desirable pressurized condition and a final portion which includes movement from a pressurized condition to a condition of relief to removal. In the continuous coil formation machines, welding takes place during the intermediate cycle portion while the electrodes, nail shank and wires are moved through a welding station which extends on both sides of a plane passing through the common axes of the disk electrodes, the axis of the nail shank and the axis of the nail rotor, whereas with the intermittent stick formation machines, welding takes place during the intermediate cycle portion while the electrodes, nail shank and wires dwell at a welding station which corresponds with a plane passing through the common axis of rotation of the disk electrodes and the axis of the nail shank. In the continuous coil formation machine, welding takes place during continuous movement through a relatively wide welding station, whereas in the intermittent stick formation machine, welding takes place during a dwell at a more narrowly defined welding station. Both provide repetitve cycles each of which includes initial movement of the shank of an unattached nail, a pair of wires extending transversely thereacross and the electrodes from an initial contact position into the welding station and a final movement out of the welding station into a final release position of the electrodes with respect to the welded together nail shank and wires.

In the operation of the continuous coil formation machines, it has been noted that a significant deterioration in the quality of the welds formed occurs whenever attempts are made to operate the machine at a rate above 2800 nail-to-wire cycles per minute.

It is an object of the present invention to provide improvements in the aforesaid prior art machines and methods which will eliminate the problem of weld quality deterioration while maintaining nail-to-wire cycle frequency well beyond the 2800 figure noted above. The present invention is based fundamentally upon both the discovery of the cause of weld quality deterioration in the prior art machines and the utilization of a principle of operation which obviates the cause. With respect to the discovered cause, applicant has determined that the cause is basically established by reason of the time reduction in the intermediate portion of each nail-to-wire cycle as the cycle frequency is increased. As the time within the welding station where optimum welding can occur is reduced to a value which is a small fraction of a single cycle of a conventional A-C 60 cycle single phase current, the energy level of the current during this time can be significantly different as for example, when the center of the welding time period corresponds with the top or bottom of the current sine wave (maximum current) and when it corresponds with the zero crossover point. Moreover, it has been noted that this effect is exaggerated where the welding operation is performed with AC pulse modification of the 60 cycle single phase A-C current. It is generally standard practice in the operation of the conventional continuous coil formation-prior art machines, to provide an adjustable SCR circuit between line current and the electrodes so that the energy level of the current available to effect the resistance welding operation can be adjusted to suit the particular circumstances. The usual situation is to provide in the full cycle current a greater energy level than normally needed and then vary this energy level downwardly by cutting out a portion of each cycle the extent of which is determined by the setting of the SCR circuit. It has been found that the existence of these gaps in the A-C current available to effect welding can result in an even greater difference in the energy level of the current available during the relatively short time of each nail-to-wire cycle when the nail, wires and electrodes are in their welding station. Indeed, where the welding station time approaches equality with the current gap time, a no available current situation is presented.

As previously indicated, the present invention is based both upon the discovery of the above indicated cause and the provision of an improved principle of operation which obviates the cause; namely, the provision of means for synchronizing the electrical current cycles connected with the electrodes and the nail-to-wire cycles so that a similar portion of each current cycle will flow through each unattached nail and the wires between the electrodes during the time period of each nail-to-wire cycle when the latter are in the welding station. In its simplest form the invention contemplates the provision of a nail rotor directly driven by a synchronous motor in which rpm of the synchronous motor based upon a 60 cycle single phase A-C current input is coordinated with the number of pockets on the rotor such that when operated 3600 pockets per minute are moved past the disc electrodes, thus establishing a frequency for the nail-to-wire cycles which is the same as the frequency of the electrical cycles utilized to effect welding (i.e. 3600 cycles per minute). Preferably phased synchronization is continuously insured by providing an appropriate phase locking feed back circuit, such as a phase locked loop. A preferred form of the phase locked loop includes a magnetic sensor for sensing the number of nail pockets on the rotor per unit time which move past a fixed sensing position, a zero crossing sensor for sensing the phase of the line current and a phase comparator receiving signals from the two sensors and controlling the frequency of a power oscillator for energizing the synchronous motor.

An operating rate of 3600 nail-to-wire cycles per minute constitutes a significant production rate increase in comparison with those presently attainable. A typical production rate is in the range of 1800 cycles per minute, with rates of 2800 being achieved with nails of the smallest size in the size range utilized. While the increase to 3600 presents significant advantages which can be achieved insofar as the physical limitation of accomplishing the nail-to-wire cycles is concerned, it is desirable to further increase the production rates beyond 3600. While it would be possible to synchronize the frequency of the nail-to-wire cycles with each half-cycle of the 60 cycle electrical current, this would result in the necessity to run at a production rate of 7200 nail-to-wire cycles, a speed which would sorely tax the mechanical ability of the machine itself as well as the supporting equipment. Consequently, it is desirable to provide the welding efficiency and uniformity of the present invention not only at production rates of 3600 and 7200, but to any desirable incremental production rate therebetween. Moreover, conditions vary due to differences in nail manufacture, wire manufacture and the like which sometimes dictate the desirability of operating at production rates less than 3600, in which case it is desirable to be able to reduce the production rate in smaller increments rather than in increments which are set by virtue of the 60 cycle line current. Accordingly, it is a further object of the present invention to provide an apparatus and method of the type described with improvements operable to achieve synchronism between the nail-to-wire cycles and the electrical cycles for welding at any desired frequency without limitation as to the line current frequently available. A preferred arrangement is to provide a second manually adjustable power oscillator the output of which is used to weld either directly or after being processed to pulse the same in the manner previously indicated and to utilize this output as the zero voltage sensed within the aforesaid phase locked loop.

Applicant is aware that in the art of continuous seam welding of tubes, as for example, tubes ultimately fabricated into tin cans or the like, there have been apparatus proposed in which there is coordination applied between the continuous AC current utilized to effect welding and the speed of movement of the continuous seam. Examples of patents of this type are: U.S. Pat. Nos. 2,264,175; 2,673,275; and 4,144,440.

It will be noted, however, that these patents do not involved cyclical phased synchronism for the simple reason that there is no repeating cycle involved in the movement of a continuous lapped seam. There are other situations presented in the welding arts in general which may be regarded as similar to the cyclical arrangement presented with respect to wire-to-nail cycles, as for example, the welding of horizontal and vertical wires of a fence, as in U.S. Pat. Nos. 3,708,646 and 3,798,405. However, the arrangements provided in both of these patents are similar to the prior practices relating to wired nails in that there is no synchronism between the wire-to-nail cycles and the electrical cycles which are used to effect welding.

These and other objects of the present invention will become more apparent during the course of the following detailed description and appended claims.

The invention may best be understood with reference to the accompanying drawings, wherein an illustrative embodiment is shown.

Figure 1:
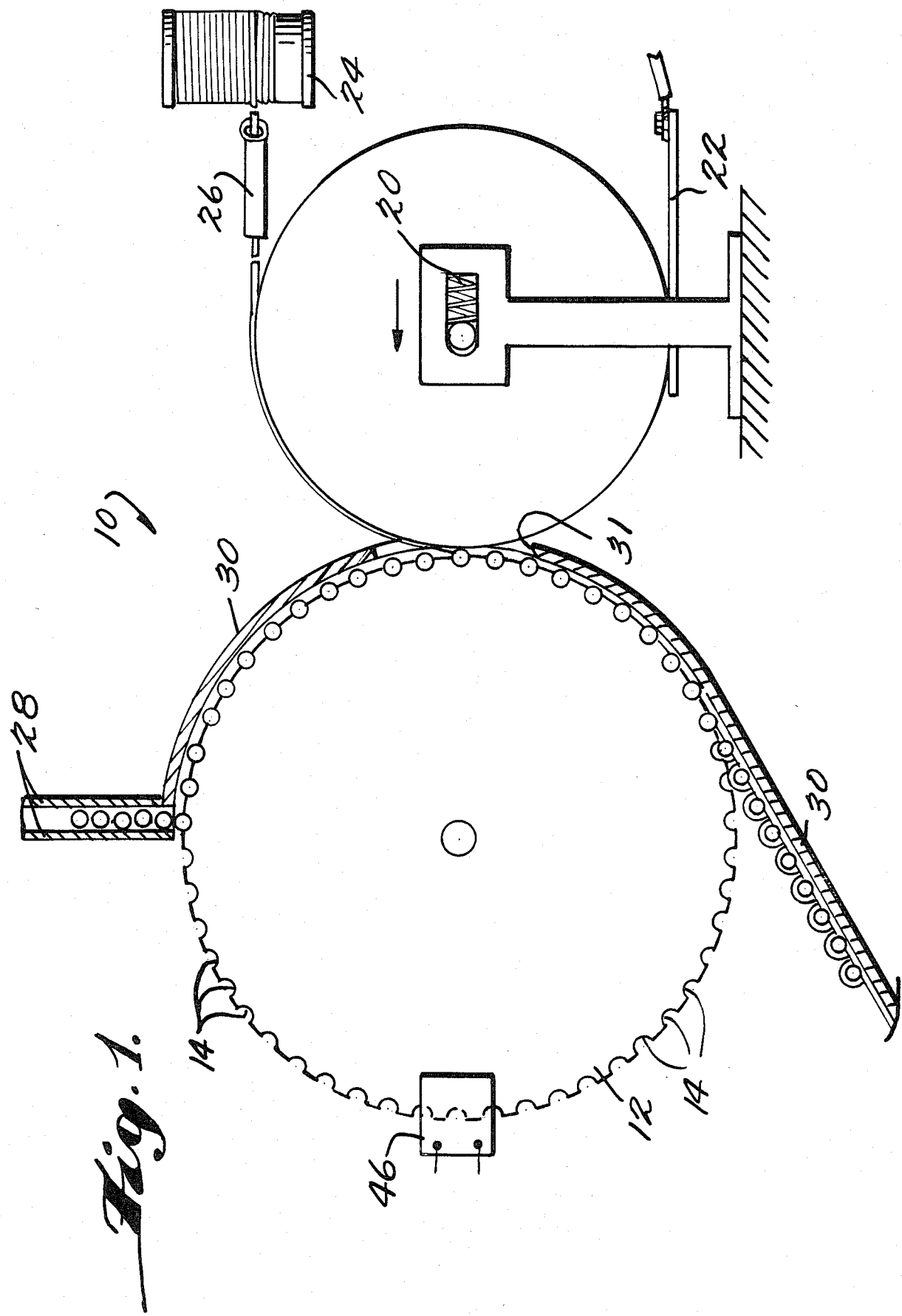
FIG. 1 is a front elevational view of an apparatus embodying the improvements constructed in accordance with the principles of the present invention.
Figure 2:
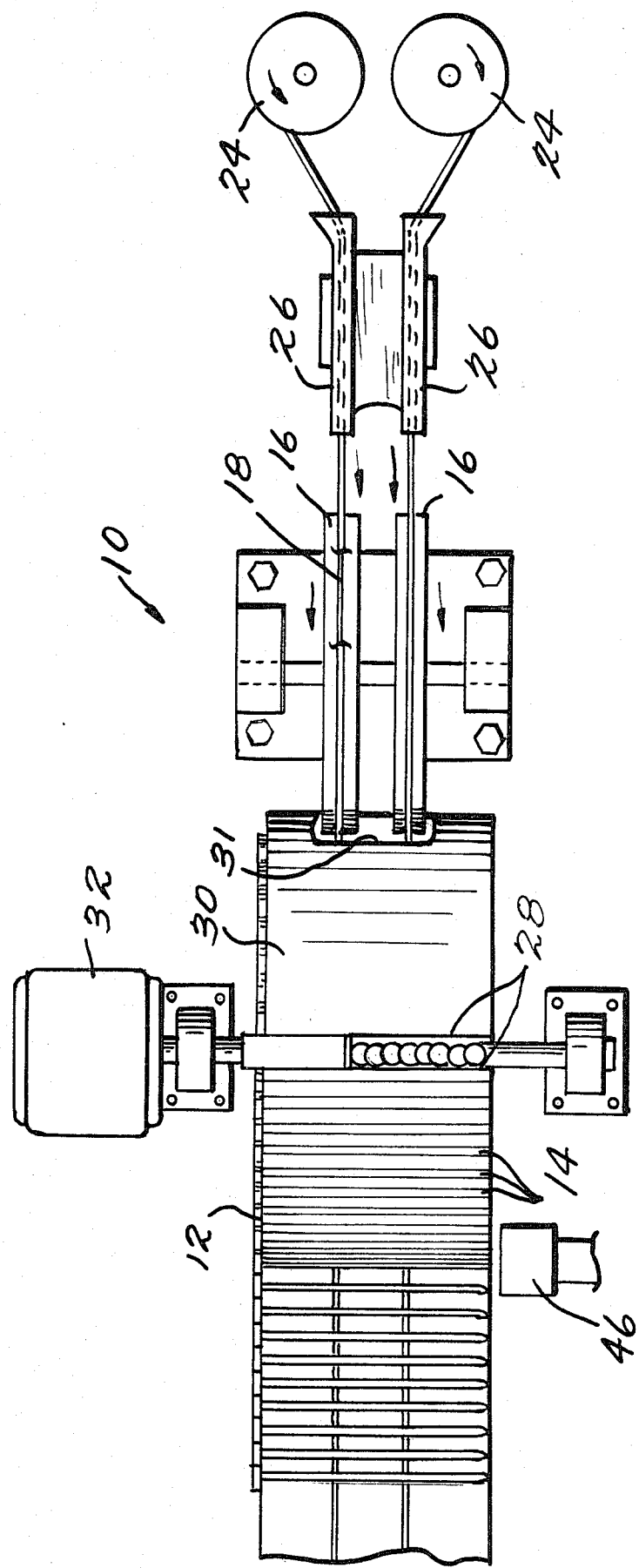
FIG. 2 is a top plan view of the apparatus components shown in FIG. 1.
Figure 3:
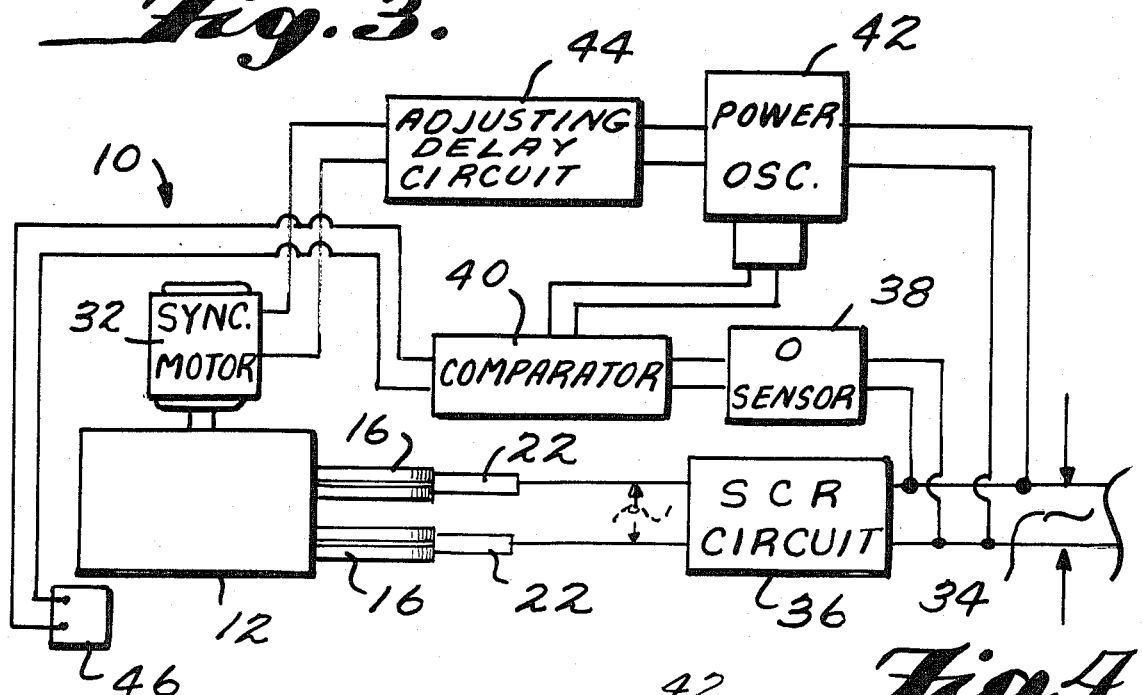
FIG. 3 is an electrical diagramatic view illustrating one form of schematic electrical circuitry for operating the apparatus components shown in FIGS. 1 and 2 in accordance with the principles of the present invention.
Figure 4:
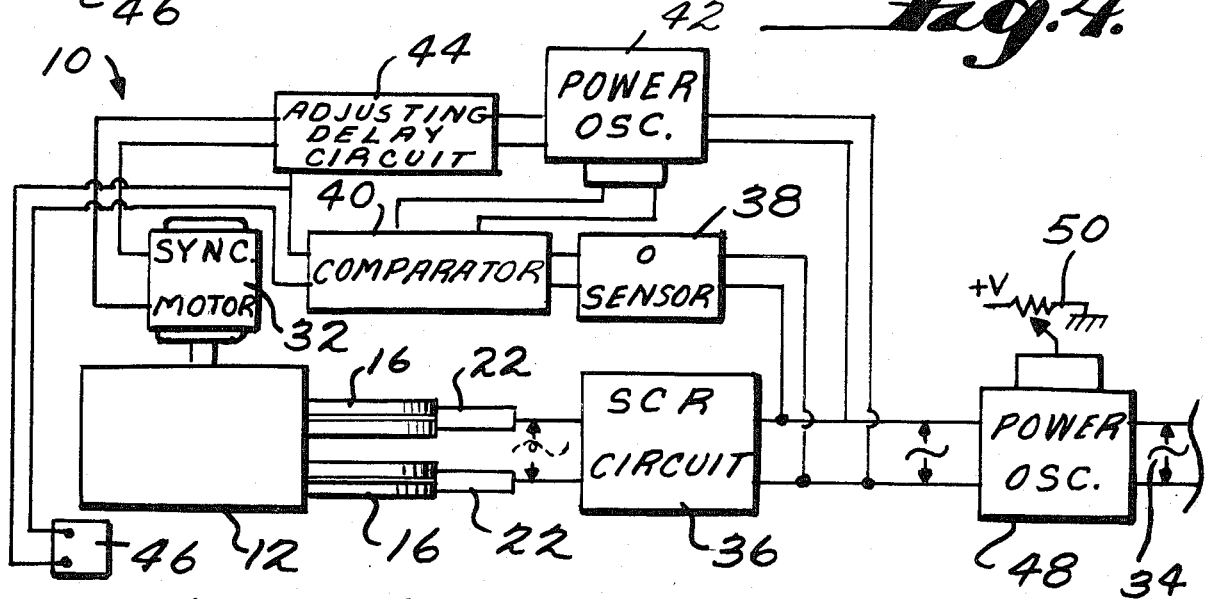
Figure 5:
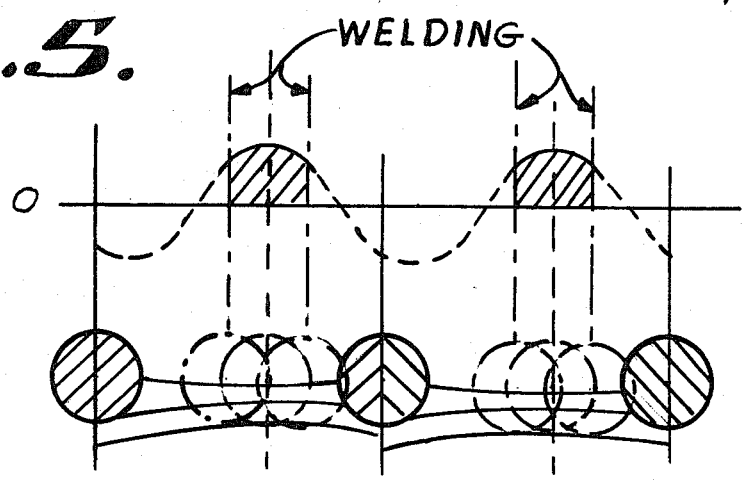

FIG. 4 is a view similar to FIG. 3 illustrating another form of schematic electrical circuitry for operating the apparatus components shown in FIGS. 1 and 2 in accordance with the principles of the present invention; and FIG. 5 is a graphic view illustrating two successive electrical current cycles and two successive nail-to-wire cycles and the synchronism between the cycles in accordance with the principles of the present invention.

Referring now more particularly to the drawings, there is shown in FIGS. 1 and 2 thereof an apparatus, generally indicated at 10, which embodies the improvements constructed in accordance with the principles of the present invention. The improvements of the present invention are applicable to both types of known prior art machines; namely, those heretofore used in forming full headed nails wired in spaced parallel relation for coil formation packaging and those used in formed notched-head nails wired in shank abutting relation for stick formation packaging. For purposes exemplary the improvements of the present invention will be described as applied to the prior art coil formation machines. As best shown in FIGS. 1 and 2, the apparatus 10 is illustrated as including essentially the same basic components as the prior art coil formation machines; namely a rotor 12 suitably mounted for rotational movement about a generally horizontally extending axis. It will be understood that the machine includes an appropriate frame structure on which the rotor 12 and other components are mounted, which frame structure is omitted from the drawings for purposes of clarity of presentation. The rotor 12 includes a number of nail receiving pockets 14 formed on the exterior periphery thereof the centers of which are spaced apart a distance equal to the spacing between nail shank centers in the wired nail coil formation ultimately produced.

The apparatus 10 also includes a pair of disk electrodes 16 each of which is constructed in a manner similar to the disk electrodes in the prior art machines so as to include an exterior peripheral wire receiving groove 18 of a depth less than one-half the diameter of the wire. The disk electrodes 16 are mounted for rotational movement about a common axis which is parallel with the axis of rotation of the nail rotor 12 and for translational biased movement in a direction toward the axis of rotation of the rotor 12 as by springs 20. Springs 20 are sized to apply a biasing force of at least 40 pounds on the disk electrodes. Disk electrodes 16 are connected with a source of electrical current characterized by repetitive cycles. As shown the connection is effected by a pair of electrical contact strips or brushes 22 contacting the bottom periphery of the electrodes respectively.

The disk electrodes 16 cooperate with the nail rotor 12 to effect repetitive nail-to-wire cycles each of which includes an initial movement of an unattached nail supported in a nail pocket 14 and a pair of wires guided within the grooves 18 of the disk electrodes 16 from an initial contact position into a welding station and a final movement out of the welding station to a release position of the disk electrodes with the welded nail shank and wires. In the exemplary embodiment shown each nail-to-wire cycle also includes an intermediate movement of the nail shank and wires maintained in pressure contact between the disk electrodes 16 and nail rotor pocket 14 through the welding station, however, as previously indicated each nail-to-wire cycle could include a dwell at a stationary welding station instead. In the exemplary embodiment shown, the extent of the welding station may be regarded to be approximately one-quarter the total extent of the movement in one cycle with the midpoint of the welding station extent coinciding with a position in which the axis of the nail shank passes into the plane which contains the common axes of the disk electrodes and the axis of the nail rotor.

The wires which enter into the nail-to-wire cycles constitute a pair of continuous wires contained on supply spools 24. A tubular guide 26 is provided between each spool 24 and associated disk electrode 16 for insuring that the associated wire from the spool is fed into the peripheral groove 18 at the uppermost point on the associated disk electrode 16.

The unattached nails which enter into the nail-to-wire cycles are fed successively to successive nail pockets as they pass a nail feed position at the uppermost point on the nail rotor. The means for feeding the unattached nails is the same as the means embodied in the prior art machines; namely, a pair of guide rails 28 having an upper receiving end (not shown) which is connected to receive successive nails therebetween from a conventional bowl feeder (not shown). The guide rails 28 extend downwardly so as to support successive nails under their heads with their shanks suspended in spaced vertical relation therebetween. At the lower end of the guide rails they are curved to form a transition wherein the nails fan downwardly so that the lowermost nail at the feed position has its shank disposed horizontally in a position to enter into the next empty pocket 14 in the nail rotor 12 to move past the position. As shown a fixed guide plate 30 extends around the periphery of the nail rotor from the feed position past the welding station to a lower discharge position. Guide plate 30 includes a cut-out or window 31 at the welding station through which the wires supported by the disk electrodes extend.

In accordance with the principles of the present invention the electrical current cycles connected with disk electrodes 16 are synchronized with the nail-to-wire cycles. In the exemplary embodiment thus far described the synchronizing is accomplished at a frequency of 3600 cycles per minute. This frequency is secured in the nail-to-wire cycles by directly driving the nail rotor 12 with a synchronous motor 32 and coordinating the synchronous rpm of the motor 32 with the number of nail pockets on the nail rotor 12 such that the number of pockets moved past a fixed position anywhere along the periphery of the rotor is 3600 pockets per minute. An exemplary embodiment is to provide 50 pockets on the rotor and a synchronous motor 32 having an rpm of 72 when energized by a single phase 60 cycle A-C current. In accordance with the discussion heretofore stated, in the exemplary embodiment the synchronous motor 32 is preferably a continuously moving one. Direct connection of the motor 32 to the nail rotor 12 is preferred since zero backlash is therefore insured; however, it will be understood that speed changing motion transmitting mechanisms can be utilized as long as a condition of zero backlash is approached.

Referring now more particularly to FIG. 3, there is shown therein a block diagram of the electrical circuitry embodied within the apparatus 10 in accordance with principles of the present invention. As shown, the electrical contact strips 22 which provide electrical energization to the disk electrodes 16 are connected across a source of single phase 60-cycle AC current indicated at 34 in FIG. 3. while the current could be utilized in the form in which it is taken from the line, it is preferable in order to provide uniformity and concentration of the energy utilized to effect the welding operation to pulse each cycle. In order to accomplish the pulsing of each cycle there is provided an adjustable SCR circuit 36 the input of which is the line current 34. Preferably the SCR circuit is designed to eliminate from each cycle all but a portion of the positive half-cycle. In the preferred exemplary embodiment described, this pulse has a width of approximately one-quarter of the full cycle and is positioned with its centerpoint at the maximum positive current. Since the frequency of the pulses which constitute the output of the SCR circuit is the same as the frequency of the line current which constitutes the input thereof, the 3,600 cycles per minute will be provided as the welding current to the disk electrodes 16.

SCR circuit 36 could, of course take many forms. A preferred exemplary construction would include a comparator circuit for sensing the phase of the input AC line current 34 and a triggering circuit for gating a silicon controlled rectifier or other power switching device to provide the pulses of welding current at the output of circuit 36. In its simplest form, the comparator and triggering circuitry would be coupled to the gate electrode of a silicon controlled rectifier coupled in series with the line current. Of course, any similar switching and triggering circuitry could be used.

In order to insure the continued synchronization of the electrical current cycles used to effect the welding operations and the nail-to-wire cycles, there is provided a phase locking feedback circuit for controlling the rotation of motor 32. The phase locking feedback circuit may assume any desired configuration including phase locked loops and the like. In the exemplary embodiment shown the phase locking feedback circuit includes an electrical cycle sensor 38 such as a zero cross-over sensor, a comparator 40, a power oscillator 42, an adjustable delay circuit 44 and a nail-to-wire cycle sensor such as a magnetic pocket sensor 46. Zero crossing sensor 38 senses the phase of the AC line current 34 which is identical to the phase of the welding current at the output of SCR 36. Magnetic pocket sensor 46 senses each pocket of the nail rotor 12 passing a predetermined fixed point at the nail rotor periphery and provides an electrical signal indicative thereof. This electrical signal from magnetic pocket sensor 46 is coupled to a first input of comparator 40. An output of zero crossing sensor 38 is coupled to a second input of comparator 40. Comparator 40 then provides an output signal indicative of the phase difference between these two signals. The output of comparator 40 constitutes a control signal used to control the frequency of power oscillator 42 which is powered directly from AC line current 34. Thus, the output of power oscillator 42 is a function of the control signal coupled thereto from comparator 40. When there is a phase identity between the nail-to-wire cycles and the welding current, the control signal from comparator 40 coupled to power oscillator 42 will be constant and synchronous motor 32 will rotate at a constant rate of speed. However, when a locked or synchronized condition does not exist, a phase difference will be sensed between the zero crossing sensor and the magnetic pocket sensor 46. This difference will cause a change to occur in the control signal coupled to power oscillator 42 to adjust its frequency either higher or lower in order to achieve phase synchronization. In order to provide an initial adjustment of phase between the line current and the nail-to-wire cycles, adjustable delay circuit 44 is provided between the output of power oscillator 42 and the input of motor 32. By adjusting delay of the power oscillator output signal, the position of the shaft of motor 32 can be controlled to coincide with any particular phase of the output of power oscillator 42.

Referring now to FIG. 4, there is shown a block diagram of an electrical circuit utilized in an alternative exemplary embodiment of apparatus 10. The circuitry shown in FIG. 4 serves to accomplish synchronism at any selected frequency with a exemplary range of approximately 2800 cycles per minute to approximated 8800 cycles per minute, rather than being limited to the single 3600 cycles per minute frequency effected by the FIG. 3 embodiment. In order to accomplish this selective frequency, the circuitry of FIG. 4 includes all of the components of the circuitry of FIG. 3 connected as shown therein and in addition includes a second power oscillator 48 interposed in the AC supply line 34. Power oscillator 48 includes a control 50 for manually adjusting its output frequency over a predetermined range that includes 60 cycles/sec. Specifically, for frequency range of 2800-8800 cycles per minute, the frequency range of power oscillator 48 would be about 46-147 cycles per second. It will be understood that the limits of the exemplary can be extended downwardly and upwardly respectively if desired. The output of power oscillator 48 is utilized in a similar fashion to the manner in which line current 34 is utilized in the FIG. 3 embodiment.

FIG. 5 graphical illustrates on a time basis the phased synchronization of the electrical cycles and the nail-to-wire cycles achieved in accordance with the principles of the present invention. In the upper portion of the Figure there are two electrical current cycles depicted. In each cycle the effect of the SCR circuit 36 is clearly shown by the dotted lines which follow a conventional sine wave. As shown, the SCR circuit 36 allows current to flow during the time just before and just after the maximum positive peak. A vertical dotted line designates the peak and two phantom lines designate the turn on and turn on and turn off points. In the bottom portion of FIG. 5 two successive nail-to-wire cycles are depicted in time oriented relation with the two electrical cycles shown. Each nail-to-wire cycle depicts in solid lines an unattached nail shank in contact with a wire at the beginning of the cycle and a nail welded to the wire at the end of the cycle. Shown in dotted lines is the position of the nail shank in the cycle at the time when the axis of the nail is aligned with a plane passing through the common axes of the disk electrodes 16 and the axis of the nail rotor 12. The two phantom line showings on opposite sides of the dotted line showing represent the position of the axis of the nail shank at the time of entry into and exit out of the welded station. The distance between the vertical phantom lines in FIG. 5 represents the time period during which welding takes place which in the case of the exemplary continuously moving synchronous motor embodiment described also represents the movement through the welding station. It should be noted that during the welding operation point contact between the nail shank and each wire changes to an area contact by virtue of the fusion resulting from the welding operation. The local thickness of each wire is reduced to approximately one half of its original dimension. Viewed in the time scale of FIG. 5, the initial movement within the nail-to-wire cycle into the welding station wherein the initial contact condition of the nail shank and wires is progressively changed to a desired pressure contact condition is represented by the distance between the left hand solid line and the adjacent vertical phantom line to the right. The final movement within the nail-to-wire cycle out of the welding station wherein pressure release of the disk electrodes takes place is represented by the distance between the next phantom line to the right and the next solid line to the right. It can be seen that a uniform concentration of electrical energy will be transmitted to the nail shank and wires to be welded at the precise time when they are in optimum pressure contact with each other and with the two disk electrodes 16 which serve to complete the circuit necessary to effect the welding operation and that this condition is retained throughout the time of operation by virtue of the maintenance of synchronizers between the electrical cycles and the nail-to-wire cycles in accordance with the principles of the present invention.

It will thus be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a method of welding the shanks of succesive nails to a pair of wires to form a series of wire connected nails suitable for packaging and use in a power driven fastener driving device, said method comprising the steps of connecting a pair of electrodes with a source of electrical current characterized by repetitive cycles and effecting repetitive nail-to-wire cycles each of which includes an initial movement of (1) the shank of an unattached nail (2) a pair of wires extending transversely thereacross and (3) said electrodes from a position of initial contact into a welding station wherein pressurized contact between said electrodes, said nail shank and said wires is maintained and a final movement out of said welding station to a final release position of said electrodes with respect to the welded together nail shank and wires, the improvement which comprises the step of:
synchronizing the electrical current cycles connected with said electrodes and said nail-to-wire cycles so that a similar portion of each current cycle will flow through each unattached nail and said pair of wires between said electrodes during the time period of each nail-to-wire cycle when the latter are in said welding station.

2. The improvement as defined in claim 1 wherein said electrical cycles and said nail-to-wire cycles are synchronized at a frequency of 3600 cycles per minute.

3. The improvement as defined in claim 1 wherein said electrical cycles and said nail-to-wire cycles are synchronized at any frequency within a range from 2800 to 8800 cycles per minute.

4. In an apparatus for welding shanks of successive nails to a pair of wires to form a series of wire connected nails suitable for packaging and use in a power driven fastener driving device, said apparatus including a pair of electrodes, means for connecting said electrodes with a source of electrical current characterized by repetitive cycles, and means for effecting repetitive nail-to-wire cycles each of which includes an initial movement of (1) the shank of an unattached nail (2) a pair of wires extending transversely thereacross and (3) said electrodes from a position of initial contact into a welding station wherein pressurized contact between said electrodes, said nail shank and said wires is maintained and a final movement out of said welding station to a final release position of said electrodes with respect to the welded together shank and wires, the improvement which comprises:
means for synchronizing the electrical current cycles connected with said electrodes and said nail-to-wire cycles so that portion of each current cycle will flow through each unattached nail and said pair of wires between said electrodes during the time period of each nail-to-wire cycle when the latter are in said welding station.

5. The improvement as defined in claim 4, wherein said nail-to-wire cycle effecting means includes a rotor having a plurality of nail receiving pockets on the exterior periphery thereof spaced apart a distance generally equally to the spacing between adjacent nails in the series of wire connected nails formed and a synchronous motor connected with said rotor operable to be energized by the cyclical electrical current connected with said electrodes so that the number of pockets per minute moved past a predetermined fixed position is equal to the number of nail-to-wire cycles per minute and the number of electrical cycles per minute.

6. The improvement as defined in claim 5 wherein said nail-to-wire cycle effecting means includes a phase locking feedback circuit for energizing said synchronous motor in phase lock with said cyclical electrical current.

7. The improvement as defined in claim 6, wherein said phase locking feedback circuit includes a first sensor for sensing each nail-to-wire cycle and a second sensor for sensing each electrical current cycle and means for insuring that the nail-to-wire cycles and electrical current cycles sensed by said sensors are maintained in synchronism.

8. The improvement as defined in claim 7, wherein said synchronism insuring means includes a comparator for comparing the cycles sensed by said first and second sensors and power oscillating means controlled by said comparator connected between said cyclical electrical current and said synchronous motor.

9. The improvement as defined in claim 7 or 8, wherein said first sensor is a magnetic sensor mounted at said fixed position in operative association with the pocketed periphery of said rotor for sensing the number of pockets per unit time passing said fixed position.

10. The improvement as defined in claim 7 or 8, wherein said second sensor is a zero crossing sensor.

11. The improvement as defined in claim 4, 5, 6, 7 or 8, wherein said cyclical electrical current is A-C current connected to said electrodes through an SCR circuit operable to eliminate all portions of each cycle except the portion generally coincident in time with the time of each nail-to-wire cycle when in said welding station.

12. The improvement as defined in claim 5, 6, 7 or 8, wherein an adjustable phase delay circuit is connected between said cyclical electrical current and said synchronous motor.

13. The improvement as defined in claim 5, 6, 7, or 8, wherein said synchronous motor is continuously rotated in response to the energization of said cyclical electrical current.

14. The improvement as defined in claim 13, wherein said electrodes comprise a pair of disk electrodes mounted for rotational movement about a common axis parallel with said rotor axis and for spring biased translational movement in a direction toward said rotor axis.

15. The improvement as defined in claim 4, 5, 6, 7 or 8, wherein said cyclical electric current constitutes the output of a manually controllable means for adjusting the frequency of the cyclical electrical current.

16. The improvement as defined in claim 15, wherein said manually controllable means comprises a manually adjustable power oscillator having a single phase A-C line current input and an output frequency determined by the manual adjustment thereof.

* * * * *